UNITED STATES PATENT OFFICE.

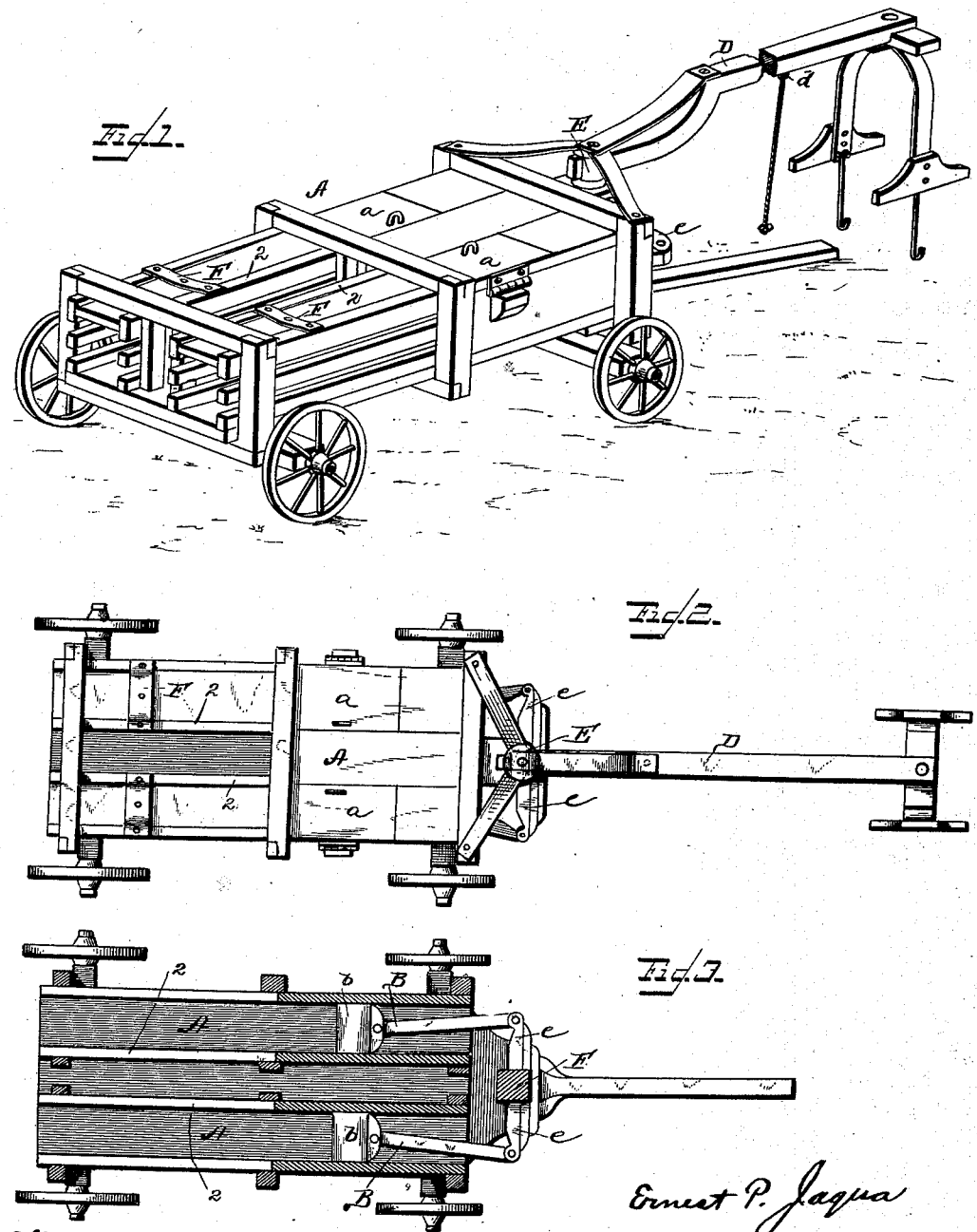

ERNEST P. JAQUA, OF NEOSHO, MISSOURI.

BALING-PRESS.

SPECIFICATION forming part of Letters Patent No. 410,102, dated August 27, 1889.

Application filed December 14, 1888. Serial No. 293,614. (No model.)

*To all whom it may concern:*

Be it known that I, ERNEST P. JAQUA, a citizen of the United States, residing at Neosho, in the county of Newton and State of Missouri, have invented certain new and useful Improvements in Baling-Presses; and I do hereby declare the following to be a full, clear, and exact description of the invention, such as will enable others skilled in the art to which it appertains to make and use the same.

My invention relates to improvements in baling-presses; and it consists in certain novel features hereinafter described and claimed.

In the accompanying drawings, Figure 1 is a perspective view of my improved machine. Fig. 2 is a plan view of the same, and Fig. 3 is a horizontal section thereof.

The frame A of the machine is provided with the interior longitudinal partitions 2 2, forming the baling-chambers, and the baling-chambers are provided with the doors $a$ in their upper sides, near their front ends, through which the material to be pressed is placed in the baling-chambers. The rear portions of the tops or roofs of the baling-chambers are depressed so as to retard the progress of the pressed material by the springs F, having their ends secured to the partitions 2, and the sides of the frame and their centers bent downward for the purpose of depressing the roofs of the chambers.

The king-bolt E is mounted at the front end of the frame, and is provided with the horizontal lateral arms $e$ $e$, to which the outer ends of the pitmen B are pivoted, the inner ends of said pitmen being pivoted to the plungers $b$, working in the baling-chambers. The sweep or lever D is secured at one end to the king-bolt, and is provided on its under side with a staple $d$, to which a rope may be secured to guide the draft-animal.

In practice the hay is fed alternately into the baling-chambers and the lever or sweep vibrated. As the sweep is vibrated, the king-bolt will be rotated and the lateral arms oscillated, so as to reciprocate the pitmen and the plungers carried thereby. The hay or other material will thus be compressed and baled in the compartments alternately, so that one chamber can be filled while the material in the other chamber is being compressed.

It will be readily seen from the foregoing description that I have provided a baling-machine which is very compactly arranged and which is strong and durable.

By the use of my machine the bales will be rapidly and easily formed, and there will be no cessation of the operation.

Having thus described my invention, what I claim, and desire to secure by Letters Patent, is—

The combination of the press-frame, the roof, and the spring passing transversely across the roof and having its ends secured to the frame, and its central portion depressed and secured to the roof, as set forth.

In testimony whereof I affix my signature in presence of two witnesses.

ERNEST P. JAQUA.

Witnesses:
W. T. KNIGHT,
I. N. KEAS.